UNITED STATES PATENT OFFICE.

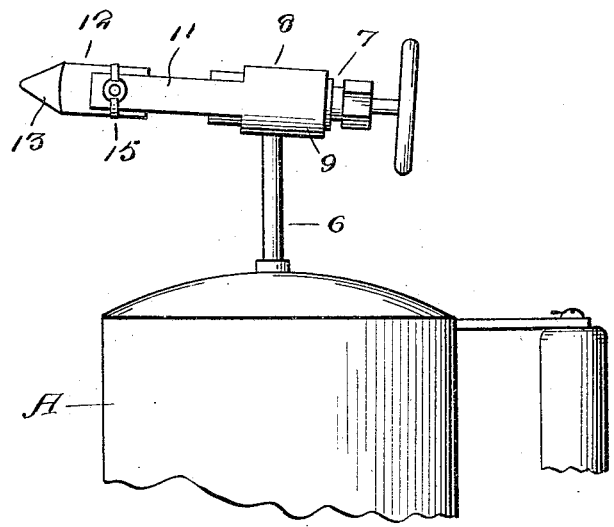
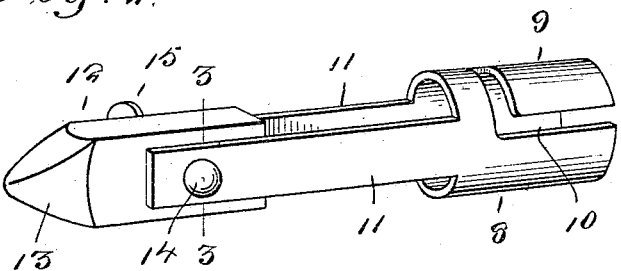
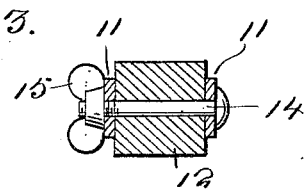

JOHN REDDICLIFFE, OF HAMILTON, ONTARIO, CANADA.

ATTACHMENT FOR BLOW-TORCHES.

1,297,245.

Specification of Letters Patent.  Patented Mar. 11, 1919.

Application filed August 5, 1918. Serial No. 248,428.

*To all whom it may concern:*

Be it known that I, JOHN REDDICLIFFE, a British citizen, of Ontario, Canada, residing at Hamilton, in the Province of Ontario and county of Ontario, Canada, have invented new and useful Improvements in Attachments for Blow-Torches, of which the following is a specification.

This invention relates to an attachment for blow torches of the hand type which are usually employed by plumbers, painters and tinners.

The primary object of the invention is to provide an attachment of this character which when applied to the nozzle of a blow torch may be employed for soldering purposes.

Another object of the invention is to provide an attachment wherein the soldering point is adjustably and reversibly mounted within a holder so constructed, as to enable the point to be readily connected with or detached from the nozzle of a blow torch when desired.

A further object of the invention is to provide an attachment wherein the holder for the soldering point is so constructed as to prevent the soldering point becoming scorched by the torch when the blow torch is held in the wind.

With these and other objects in view, the invention resides in the novel combination and arrangements of parts, which will be hereinafter described and particularly pointed out in the claim.

The preferred embodiment of the invention has been illustrated in the accompanying drawings, although no restriction is necessarily made to the precise details of construction therein shown, as changes, alterations, and modifications within the scope of the claim may be resorted to when desired.

In the drawings:—

Figure 1 is a view in side elevation of a portion of a blow torch to the nozzle of which is shown applied an attachment constructed in accordance with the invention.

Fig. 2 is a perspective view of the attachment.

Fig. 3 is a vertical transverse section on the line 3—3 of Fig. 1.

Like characters of reference denote corresponding parts throughout the several views in the drawings.

Referring now to the drawing in detail the letter A designates a portion of a blow torch of the type which is particularly adapted for the use of plumbers and painters and in which the body of the torch has extending upwardly therefrom a nozzle support 6 upon which is mounted a nozzle 7.

The improved attachment 8 for the torch A which in Fig. 1 in the drawing has been shown applied to the nozzle 7 of the torch includes a collar 9 in which is formed a bayonet slot 10 whereby, when the nozzle 7 of the torch has been passed through the collar 9 and the nozzle support 6 seated in the slot 10 the attachment may be retained in place upon the torch for soldering purposes.

Formed on the collar 9 at one end thereof are a pair of spaced and parallel arms 11 which when the attachment is applied to the torch A extend beyond the nozzle 7.

A soldering point 12 preferably formed from copper is arranged between the arms 11 and is provided with a pointed and tinned end 13. The soldering point 12 has passed through an opening therein a bolt 14 which also passes through openings in the arms 11 in line with the opening in the soldering point. The bolt 14 has adjustably mounted thereon to bear against one of the arms 11 a winged nut 15 through the adjustment of which on the bolt 14 the arms may be moved into and out of clamping engagement with the soldering point 12, thereby enabling the point not only to be adjusted at an angle with relation to the nozzle of the torch but to be reversed when the occasion requires.

From the foregoing description taken in connection with the accompanying drawing it is apparent that an attachment for blow torches has been provided which may be employed for soldering purposes and is so constructed that when applied to a blow torch the soldering point forming a part of the attachment may not only be quickly and conveniently heated but may be adjusted at right angle with relation to the nozzle of the torch if desired.

Having thus described the invention, what is claimed as new, is:—

The combination with a blow torch having a nozzle support upon which is mounted a laterally extending nozzle, of a member including a collar having a bayonet slot, said collar designed to be received on the nozzle and to be turned to bring the nozzle support in the lateral passage of the bayonet slot, integrally formed longitudinally extending arms on the opposite edges of the collar at the end thereof opposite that through which the longitudinal passage of the bayonet slot passes, a soldering point designed to be received between the outer ends of said arms, and pivotal compressing means between the arms and the point.

In testimony whereof I affix my signature.

JOHN REDDICLIFFE.

Copies of this patent may be obtained for five cents each, by addressing the "Commissioner of Patents, Washington, D. C."